Patented June 10, 1930

1,762,610

UNITED STATES PATENT OFFICE

KENNETH F. COOPER, OF GREAT NECK, NEW YORK, AND WILLIAM MOORE, OF RUTHERFORD, NEW JERSEY, ASSIGNORS TO AMERICAN CYANAMID COMPANY, OF NEW YORK, N. Y., A CORPORATION OF MAINE

INSECTICIDE BARRIER

No Drawing. Application filed September 21, 1923. Serial No. 664,090.

This invention relates to a method of applying an insecticide similar to that described in a copending application Serial No. 653,383 of K. F. Cooper, filed July 23, 1923, and deals more particularly with economical ways of employing it. In addition it points out methods of employing other materials in conjunction with the insecticide so that both its efficiency and that of the other materials with which it is employed, may be increased.

The object of this invention is to regulate the treatment of insect pests which pass a considerable portion of their existence on the surface of the ground, and to employ barriers and similar means of exterminating them. The chinch bug is a notable illustration of this type of insect, and at the present time the methods of extermination are physical rather than chemical. When chemical methods are employed the object is frequently more to divert the insects than to destroy them. The object of the present invention is to combine to the best advantage both the diverting and the destroying methods, and in this way increase the efficiency of both. With these and other objects in view the invention consists of the various steps and combination of steps constituting the process, and in the new method of applying the various materials, all as will be more fully hereinafter described and particularly pointed out in the claims.

As an example of this invention I employ Aero brand cyanide and creosote, and use them alternately in the barriers. If a barrier of creosote is laid down, the insects in approaching will endeavor to avoid it as the odor is very objectionable if not injurious to them, and they will turn and move in a direction parallel to the barrier, hoping in this way to pass around it.

The materials employed in forming the barrier are laid down in about the proportion of one pound to sixty feet.

The present method of treatment is based on the fact that the pests may through their aversion to certain materials, especially those that have decided odors, be massed at certain points and destroyed with the least possible expenditure of insecticide. It will thus be readily apparent that the number of actual combinations of the repellent and poisonous materials is dependent largely upon the skill of the operator, and his ingenuity.

A very simple method consists in alternately placing creosote and cyanide in the line, and employing long stretches of the repellent barrier and short thick sections of the cyanide. Apparently most insects do not detect the odor of cyanide and if they do they are not repelled by it. Another method consists in locating cross barriers of the cyanide at various intervals. Still another method is to maintain a more or less permanent barrier of cresote and at various intervals place a little cyanide a short distance in front of it. Another method consists in laying down a continuous light barrier of cresote and a light barrier of cyanide just behind it, so that any insects passing over the first will be killed by the second. It has also been found advisable to place a short barrier of Aero brand cyanide behind openings in an extended barrier of cresote. The insect pests mass at these openings and a smaller amount of cyanide is required.

It will be apparent to any one familiar with insect pests that various methods may be devised of combining materials of this nature to obtain the best results. The relative proportions of the materials and their rate of application are dependent to a large degree upon the particular pests that are to be destroyed. In the place of creosote various other odoriferous materials may be employed, such as cresols, phenols, soft tar, petroleum oils, cresylic acid, xylenols, etc.

As the calcium cyanide composition, as disclosed in the United States Patent 1,359,257 to Walter S. Landis, and usually known as Aero brand cyanide, liberates hydrocyanic acid in presence of the moisture in the air, the actual rate of liberation varies with the climatic conditions and the proportion of moisture in the atmosphere at any given time. This makes it advisable to carefully select the time and the proportions of material to be used. By employing a barrier that is not affected by atmospheric conditions, such as creosote, it is possible to employ the cyanide in the best manner possible and conserve it in all cases.

These creosote and cyanide barriers may be of any suitable construction and relative disposition. One form of the same would be a line of creosote sprinkled on the surface of the ground, which would cause the insects to follow along the same, and would lead them to a line of finely divided cyanide also sprinkled on the ground. This last named line or barrier may be disposed in the creosote line and constitute a section of the same, as above stated, or it may be disposed at an angle thereto. In either case, the pests are more or less massed when they attempt to cross the cyanide material. Instead of making a single creosote line, one may use a pair of such lines inclined to each other, thus forming a space resembling an open-ended V, and at the opening between the converging ends of these lines, the short cyanide line is placed, so that the insects are guided by both the creosote lines to the cyanide line.

Of course, it is obvious that there is an endless number of forms in which these lines of poison may be disposed, but the above will give specific examples of some of them. It is further clear that instead of sprinkling the creosote and cyanide material on the ground, furrows may be run over the field in any desired relation to each other, and the materials sprinkled in said furrows.

It is obvious that those skilled in the art may vary the procedure and adopt radically different materials without departing from the spirit of the invention. Therefore I do not wish to be limited to the above disclosures except as may be required by the claims.

I claim:

1. A method of destroying insect pests which comprises so locating a material possessing an odor repellent to insects, and a material giving off a poisonous gas, that the insects in seeking to avoid the former will come within the range of the latter; substantially as described.

2. A method of destroying insect pests which comprises so locating creosote and a cyanide capable of evolving hydrocyanic acid gas in presence of the moisture of the air, that the insects in seeking to pass around the former will come within the influence of the latter; substantially as described.

3. A surface carrying an insect barrier made up of creosote and calcium cyanide so located that the insect in avoiding the former will come in contact and be killed by the latter; substantially as described.

4. A surface carrying an insect barrier made up of an odoriferous non-poisonous material and a material exuding an odorless poisonous gas; substantially as described.

5. An insect barrier made up of adjacent sections of an insect repellent material and a cyanide which, under atmospheric conditions, is capable of liberating its hydrocyanic acid content in toxic concentrations.

6. A surface carrying an insect barrier made up of a continuous section of an insect repellent material and one or more sections of an insecticidal material at an angle to said repellent material and substantially contiguous therewith, said insecticidal material being capable of liberating a toxic gas.

In testimony whereof we affix our signatures.

KENNETH F. COOPER.
WILLIAM MOORE.